US011216186B1

(12) United States Patent
Armangau et al.

(10) Patent No.: US 11,216,186 B1
(45) Date of Patent: Jan. 4, 2022

(54) MANAGING INLINE DATA COMPRESSION IN STORAGE SYSTEMS

(71) Applicant: EMC IP Holding Company LLC, Hopkinton, MA (US)

(72) Inventors: Philippe Armangau, Action, MA (US); Ivan Bassov, Brookline, MA (US); Monica Chaudhary, South Grafton, MA (US); Ajay Karri, Natick, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/393,443

(22) Filed: Dec. 29, 2016

(51) Int. Cl.
*G06F 3/06* (2006.01)
*G06F 16/17* (2019.01)
*G06F 12/02* (2006.01)

(52) U.S. Cl.
CPC ............ *G06F 3/0608* (2013.01); *G06F 3/064* (2013.01); *G06F 3/067* (2013.01); *G06F 3/0644* (2013.01); *G06F 3/0647* (2013.01); *G06F 3/0661* (2013.01); *G06F 12/023* (2013.01); *G06F 16/1727* (2019.01); *G06F 2212/1044* (2013.01); *G06F 2212/401* (2013.01)

(58) Field of Classification Search
None
See application file for complete search history.

(56) References Cited

U.S. PATENT DOCUMENTS

2010/0274773 A1* 10/2010 Pawar ................. G06F 12/0804
707/693

* cited by examiner

*Primary Examiner* — Michael Alsip
(74) *Attorney, Agent, or Firm* — Krishnendu Gupta; Deepika Bhayana; Dorothy Wu Chiang

(57) ABSTRACT

A method is used in managing inline data compression in storage systems. A request is received to flush data of a file system to a storage device of a storage system. A compression ratio is determined for writing the data to the storage device in a compressed format. Based on the determination, a number of allocation units is determined in which a segment is apportioned. The segment comprises of a set of allocation units in the compressed format. Based on the determination, the data is written to the segment in the compressed format.

18 Claims, 4 Drawing Sheets

MANAGING INLINE DATA COMPRESSION IN STORAGE SYSTEMS

CROSS REFERENCE TO RELATED APPLICATIONS

This application is related to co-pending U.S. patent application Ser. No. 10/157,006 entitled MANAGING INLINE DATA COMPRESSION IN STORAGE SYSTEMS filed on Dec. 29, 2016, which is incorporated herein by reference, co-pending U.S. patent application Ser. No. 10/156,993 entitled MANAGING INLINE DATA COMPRESSION IN STORAGE SYSTEMS filed on Dec. 29, 2016, which is incorporated herein by reference, and co-pending U.S. patent application Ser. No. 10/430,376 entitled MANAGING INLINE DATA COMPRESSION IN STORAGE SYSTEMS filed on Dec. 29, 2016, which is incorporated herein by reference.

BACKGROUND

Technical Field

This application relates to managing inline data compression in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes. Disk arrays may also include groups of physical disks that are logically bound together to represent contiguous data storage space for applications.

Some data storage systems employ software compression and decompression to improve storage efficiency. For example, software compression involves loading compression instructions into memory and executing the instructions on stored data using one or more processing cores. A result of such software compression is that compressed data requires less storage space than the original, uncompressed data. Conversely, software decompression involves loading decompression instructions into the memory and executing the instructions on the compressed data using one or more of the processing cores, to restore the compressed data to its original, uncompressed form.

Other data storage systems perform compression and decompression in hardware. For example, a data storage system may include specialized hardware for compressing and decompressing data. The specialized hardware may be provided on the storage processor itself, e.g., as a chip, chipset, or sub-assembly, or on a separate circuit board assembly. Unlike software compression, which operates by running executable software instructions on a computer, hardware compression employs one or more ASICs (Application Specific Integrated Circuits), FPGAs (Field Programmable Gate Arrays), RISC (Reduced Instruction Set Computing) processors, and/or other specialized devices in which operations may be hard-coded and performed at high speed.

SUMMARY OF THE INVENTION

A method is used in managing inline data compression in storage systems. A request is received to flush data of a file system to a storage device of a storage system. A compression ratio is determined for writing the data to the storage device in a compressed format. Based on the determination, a number of allocation units is determined in which a segment is apportioned. The segment comprises of a set of allocation units in the compressed format. Based on the determination, the data is written to the segment in the compressed format.

BRIEF DESCRIPTION OF THE DRAWINGS

Features and advantages of the present technique will become more apparent from the following detailed descrip

DETAILED DESCRIPTION OF EMBODIMENT(S)

Figure 1:
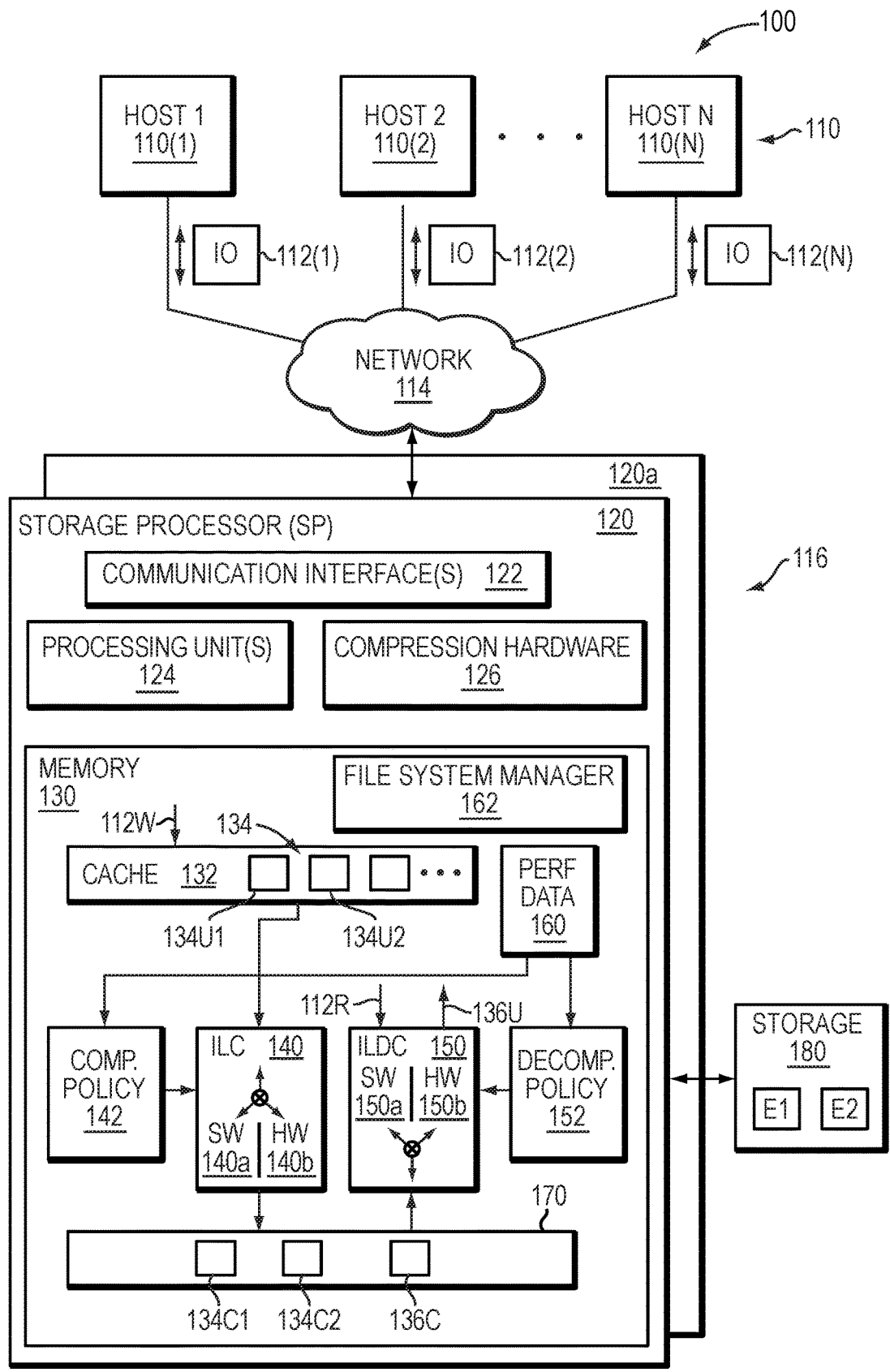
- FIG. 1 is an example of an embodiment of a computer system that may utilize the techniques described herein.

Described below is a technique for use in managing inline data compression in storage systems, which technique may be used to provide, among other things, receiving a request to flush data of a file system to a storage device of a storage system, determining a compression ratio for writing the data to the storage device in a compressed format, based on the determination, determining a number of allocation units in which a segment is apportioned, the segment comprising of a set of allocation units in the compressed format, and based on the determination, writing the data to the segment in the compressed format.

Data Compression is an efficiency feature that allows users to store information using less storage capacity than storage capacity used without compression. With data compression, users can significantly increase storage utilization for data such as file and block data. Data compression may be characterized as the process of encoding source information using an encoding scheme into a compressed form having fewer bits than the original or source information. Different encoding schemes may be used in connection with data compression.

Compression may be a LUN attribute that can be enabled or disabled. When data compression is enabled, data on a LUN may be compressed as a background task. Compression may be performed in three different phases. First phase being an initial compression which occurs when data compression is first enabled for a LUN. Entire LUN may be processed during this phase. Second phase is compression of new data which is sent by a host when the host sends a write request to a LUN. In such a case, the data is written in an uncompressed format and compressed asynchronously in background at a later time. As a result, when new data is written to a compressed LUN, the consumed capacity of the compressed LUN may increase temporarily because the new data is not written in compressed format initially. Further, when a storage system receives a new write request directed to compressed data, the compressed data may need to be first uncompressed, the uncompressed data is updated with the new write request, and updated uncompressed data is compressed again. Alternatively, when a storage system receives a new write request directed to compressed data, the compressed data may be left as-is and new data may be written to a new location.

Inline compression (also referred to herein as "ILC") provides the ability to reduce the amount of storage required to store user data on a storage device of a storage system by compressing portions of the data at the time the data is first written to the storage device. Further, storage system resources such as CPU resources, that may otherwise remain unused, are utilized to perform inline data compression on a write data path indicating that data is compressed prior to writing the data on a storage device. Generally, ILC may be enabled by default on a storage system. However a user may be provided the ability to make a decision regarding which storage objects should be subject to compression. Further, ILC is intended to lower the cost of storage consumed (i.e., $/GB), but it is also a goal for ILC to improve the cost based on number of IO operations performed in a storage system (IOPs performed in a specific time) through better utilization.

Data storage systems commonly arrange data in file systems, and file systems commonly store data, as well as metadata, in blocks. As is known, a "block" is the smallest unit of storage that a file system can allocate. Blocks for a given file system are generally of fixed size, such as 4 KB, 8 KB, or some other size.

File systems typically categorize blocks as either allocated or free. Allocated blocks are those which are currently in use, whereas free blocks are those which are not. As a file system operates, it tends to allocate new blocks, to accommodate new data, but it also tends to generate new free blocks, as previously allocated blocks become free. The file system may run utilities (e.g., space maker, file system reorganizer) to coalesce ranges of contiguous free blocks. For example, a utility may move data found in allocated blocks between areas of the file system to create large regions of entirely free blocks. In various examples, the file system may return such regions of free blocks to a storage pool; it may also make such regions available to accommodate new writes of sequential data.

In a storage system enabled with inline data compression, data of file systems is generally compressed down to sizes smaller than a block and such compressed data is packed together in multi-block segments. Further, a file system manager may include a persistent file data cache aggregation logic that selects a set of allocation units (also referred to herein as "data fragment" or "storage extent" or "blocks") for compressing the set of allocation units and organizes the compressed allocation units in a segment. Further, each compressed allocation unit in a segment may also be simply referred to herein as a fragment. Thus, data of a file system may be stored in a set of segments. A segment may be composed from multiple contiguous blocks where data stored in the segment includes multiple compressed storage extents having various sizes.

Further, for each compressed storage extent in a segment of a file system, a corresponding weight is associated where the weight is arranged to indicate whether the respective storage extent is currently part of any file in the file system. In response to performing a file system operation that changes the weight of a storage extent in a segment of a file system to a value that indicates that the storage extent is no longer part of any file in the file system, the storage extent is marked as a free storage extent such that a scavenging utility can scavenge free space at a later time.

A data compression ratio for data is defined as the ratio between the uncompressed size and compressed size of the data. For example, a compression ratio of 2 to 1 (or also referred to herein as 50%) indicates that the compressed size of compressed data is about one half the original size of uncompressed data, while a compression ratio of 10 to 1 (also referred to herein as 10%) indicates that the compressed size of compressed data is about a tenth of the original size of original data. Further, storage space savings achieved by compressing data may be defined as the reduction in compressed size of compressed data relative to the uncompressed size. For example, if a file system of 10 Mega Bytes (MB) in size is compressed to 2 MB; a compression ratio is computed as 80% that yields storage space savings of 0.8.

In a storage system enabled with inline data compression, conventionally, a persistent file data cache aggregation logic attempts to maximize the number of data fragments (allocation units) that can be included in a compressed segment in order to increase the compression ratio at which data is compressed by including as many data fragments in a compressed segment as possible. However, in such a conventional system, including more number of data fragments in a compressed segment does not always result in an increase in a compression ratio. Further, in such a conventional system, including the maximum number of data fragments in a compressed segment may lead to wastage of storage space. For example, in such a conventional system, if user data is compressed at a compression ratio of 50% such that the size of the compressed user data is one half of the size of the uncompressed user data and persistent file data cache aggregation logic selects twelve (12) allocation units in a set, such twelve allocation units are compressed into six compressed data fragments. In such a conventional system, six compressed data fragment occupies more than one segment if a segment can accommodate six allocation units as each compressed data fragment is associated with a header thereby using a portion of storage space from a seventh data fragment in order to accommodate compression headers for each compressed data fragment. Thus, in such a conventional system, remaining portion of the seventh data fragment remains unused leading to wastage of storage space until the time such data fragment becomes free and scavenged by a background garbage collection process. Thus, in such a conventional system, data compressed by using a compression ratio of 50% only yields storage space savings of 38% because a portion of storage space remains unused at the end of a compressed segment as described above herein.

By contrast, in at least some implementations in accordance with the current technique, persistent file data cache aggregation logic of a storage system enabled with inline data compression uses statistical heuristics to determine how many data fragments can be packed together in a compressed segment in order to avoid wasting as little storage space as possible. In at least one embodiment of the current technique, persistent file data cache aggregation logic of a storage system uses the current estimated compression ratio at which data is being compressed in the storage system and determines the number of allocation units that can be compressed in a segment in order to avoid as little wastage of storage space as possible. Further, in at least one embodiment of the current technique, information such as an average compression ratio at which a specific number of previous segments have been compressed per file system is tracked for performing statistical analysis on such information to determine the number of allocation units that can be aggregated in a compressed segment efficiently. However, it should be noted that any other information or heuristics can be used to predict the number of allocation units that can be aggregated in a compressed segment efficiently.

In at least some implementations in accordance with the technique as described herein, the use of the managing inline data compression in storage systems technique can provide one or more of the following advantages: improving storage utilization by efficiently aggregating a number data fragments in a compressed segment thereby resulting in less wastage of storage space in a storage system, improving storage system efficiency by efficiently determining how many allocation units to include in a compressed segment in order to efficiently use storage space of each compressed segment in a file system, improving compression ratio, and inducing less flush ware, and improving IO performance in a storage system by efficiently compressing data of a file system.

Described in following paragraphs are techniques that may be used in an embodiment in accordance with techniques herein to efficiently compress contiguous free block sets of file system address space that may be allocated for use, for example, for a file system.

FIG. 1 depicts an example embodiment of a system that may be used in connection with performing the techniques described herein. Here, multiple host computing devices ("hosts") 110, shown as devices 110(1) through 110(N), access a data storage system 116 over a network 114. The data storage system 116 includes a storage processor, or "SP," 120 and storage 180. In an example, the storage 180 includes multiple disk drives, such as magnetic disk drives, electronic flash drives, optical drives, and/or other types of drives. Such disk drives may be arranged in RAID (Redundant Array of Independent/Inexpensive Disks) groups, for example, or in any other suitable way.

In an example, the data storage system 116 includes multiple SPs, like the SP 120 (e.g., a second SP, 120a). The SPs may be provided as circuit board assemblies, or "blades," which plug into a chassis that encloses and cools the SPs. The chassis may have a backplane for interconnecting the SPs, and additional connections may be made among SPs using cables. No particular hardware configuration is required, however, as any number of SPs, including a single SP, may be provided and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO (input/output) requests 112(1-N) according to block-based and/or file-based protocols and to respond to such IO requests 112(1-N) by reading and/or writing the storage 180.

As further shown in FIG. 1, the SP 120 includes one or more communication interfaces 122, a set of processing units 124, compression hardware 126, and memory 130. The communication interfaces 122 may be provided, for example, as SCSI target adapters and/or network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs.

The compression hardware 126 includes dedicated hardware, e.g., one or more integrated circuits, chipsets, subassemblies, and the like, for performing data compression and decompression in hardware. The hardware is "dedicated" in that it does not perform general-purpose computing but rather is focused on compression and decompression of data. In some examples, compression hardware 126 takes the form of a separate circuit board, which may be provided as a daughterboard on SP 120 or as an independent assembly that connects to the SP 120 over a backplane, midplane, or set of cables, for example. A non-limiting example of compression hardware 126 includes the Intel® QuickAssist Adapter, which is available from Intel Corporation of Santa Clara, Calif.

The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a cache 132, an inline compression (ILC) engine 140, an inline decompression (ILDC) engine 150, and a data object 170. A compression policy 142 provides control input to the ILC engine 140, and a decompression policy 152 provides control input to the ILDC engine 150. Both the compression policy 142 and the decompression policy 152 receive performance data 160, which describe a set of operating conditions in the data storage system 116.

In an example, the data object 170 is a host-accessible data object, such as a LUN (Logical UNit), a file system, or a virtual machine disk (e.g., a VVol, available from VMWare, Inc. of Palo Alto, Calif.). The SP 120 exposes the data object 170 to hosts 110 for reading, writing, and/or other data operations. In one particular, non-limiting example, the SP 120 runs an internal file system and implements data object 170 within a single file of that file system. In such an example, the SP 120 includes mapping (not shown) to convert read and write requests from hosts 110 (e.g., IO requests 112(1-N)) to corresponding reads and writes to the file in the internal file system.

As further shown in FIG. 1, ILC engine 140 includes a software component (SW) 140a and a hardware component (HW) 140b. The software component 140a includes a compression method, such as an algorithm, which may be implemented using software instructions. Such instructions may be loaded in memory and executed by processing units 124, or some subset thereof, for compressing data directly, i.e., without involvement of the compression hardware 126. In comparison, the hardware component 140b includes software constructs, such as a driver and API (application programmer interface) for communicating with compression hardware 126, e.g., for directing data to be compressed by the compression hardware 126. In some examples, either or both components 140a and 140b support multiple compression algorithms. The compression policy 142 and/or a user may select a compression algorithm best suited for current operating conditions, e.g., by selecting an algorithm that produces a high compression ratio for some data, by selecting an algorithm that executes at high speed for other data, and so forth.

For decompressing data, the ILDC engine 150 includes a software component (SW) 150a and a hardware component (HW) 150b. The software component 150a includes a decompression algorithm implemented using software instructions, which may be loaded in memory and executed by any of processing units 124 for decompressing data in software, without involvement of the compression hardware 126. The hardware component 150b includes software constructs, such as a driver and API for communicating with compression hardware 126, e.g., for directing data to be decompressed by the compression hardware 126. Either or both components 150a and 150b may support multiple decompression algorithms. In some examples, the ILC engine 140 and the ILDC engine 150 are provided together in a single set of software objects, rather than as separate objects, as shown.

In example operation, hosts 110(1-N) issue IO requests 112(1-N) to the data storage system 116 to perform reads and writes of data object 170. SP 120 receives the IO requests 112(1-N) at communications interface(s) 122 and passes them to memory 130 for further processing. Some IO requests 112(1-N) specify data writes 112W, and others specify data reads 112R. Cache 132 receives write requests 112W and stores data specified thereby in cache elements 134. In a non-limiting example, the cache 132 is arranged as a circular data log, with data elements 134 that are specified in newly-arriving write requests 112W added to a head and with further processing steps pulling data elements 134 from a tail. In an example, the cache 132 is implemented in DRAM (Dynamic Random Access Memory), the contents of which are mirrored between SPs 120 and 120a and persisted using batteries. In an example, SP 120 may acknowledge writes 112W back to originating hosts 110 once the data specified in those writes 112W are stored in the cache 132 and mirrored to a similar cache on SP 120a. It should be appreciated that the data storage system 116 may host multiple data objects, i.e., not only the data object 170, and that the cache 132 may be shared across those data objects.

When the SP 120 is performing writes, the ILC engine 140 selects between the software component 140a and the hardware component 140b based on input from the compression policy 142. For example, the ILC engine 140 is configured to steer incoming write requests 112W either to the software component 140a for performing software compression or to the hardware component 140b for performing hardware compression.

In an example, cache 132 flushes to the respective data objects, e.g., on a periodic basis. For example, cache 132 may flush element 134U1 to data object 170 via ILC engine 140. In accordance with compression policy 142, ILC engine 140 selectively directs data in element 134U1 to software component 140a or to hardware component 140b. In this example, compression policy 142 selects software component 140a. As a result, software component 140a receives the data of element 134U1 and applies a software compression algorithm to compress the data. The software compression algorithm resides in the memory 130 and is executed on the data of element 134U1 by one or more of the processing units 124. Software component 140a then directs the SP 120 to store the resulting compressed data 134C1 (the compressed version of the data in element 134U1) in the data object 170. Storing the compressed data 134C1 in data object 170 may involve both storing the data itself and storing any metadata structures required to support the data 134C1, such as block pointers, a compression header, and other metadata.

It should be appreciated that this act of storing data 134C1 in data object 170 provides the first storage of such data in the data object 170. For example, there was no previous storage of the data of element 134U1 in the data object 170. Rather, the compression of data in element 134U1 proceeds "inline" because it is conducted in the course of processing the first write of the data to the data object 170.

Continuing to another write operation, cache 132 may proceed to flush element 134U2 to data object 170 via ILC engine 140, which, in this case, directs data compression to hardware component 140b, again in accordance with policy 142. As a result, hardware component 140b directs the data in element 134U2 to compression hardware 126, which obtains the data and performs a high-speed hardware compression on the data. Hardware component 140b then directs the SP 120 to store the resulting compressed data 134C2 (the compressed version of the data in element 134U2) in the data object 170. Compression of data in element 134U2 also takes place inline, rather than in the background, as there is no previous storage of data of element 134U2 in the data object 170.

In an example, directing the ILC engine 140 to perform hardware or software compression further entails specifying a particular compression algorithm. The algorithm to be used in each case is based on compression policy 142 and/or specified by a user of the data storage system 116. Further, it should be appreciated that compression policy 142 may operate ILC engine 140 in a pass-through mode, i.e., one in which no compression is performed. Thus, in some examples, compression may be avoided altogether if the SP 120 is too busy to use either hardware or software compression.

In some examples, storage 180 is provided in the form of multiple extents, with two extents E1 and E2 particularly shown. In an example, the data storage system 116 monitors a "data temperature" of each extent, i.e., a frequency of read and/or write operations performed on each extent, and selects compression algorithms based on the data temperature of extents to which writes are directed. For example, if extent E1 is "hot," meaning that it has a high data temperature, and the data storage system 116 receives a write directed to E1, then compression policy 142 may select a compression algorithm that executes at high speed for compressing the data directed to E1. However, if extent E2 is "cold," meaning that it has a low data temperature, and the data storage system 116 receives a write directed to E2, then compression policy 142 may select a compression algorithm that executes at high compression ratio for compressing data directed to E2.

When SP 120 performs reads, the ILDC engine 150 selects between the software component 150a and the hardware component 150b based on input from the decompression policy 152 and also based on compatible algorithms. For example, if data was compressed using a particular software algorithm for which no corresponding decompression algorithm is available in hardware, the ILDC engine 150 may steer the compressed data to the software component 150a, as that is the only component equipped with the algorithm needed for decompressing the data. However, if both components 150a and 150b provide the necessary algorithm, then selection among components 150a and 150b may be based on decompression policy 152.

To process a read request 112R directed to compressed data 136C, the ILDC engine 150 accesses metadata of the data object 170 to obtain a header for the compressed data 136C. The compression header specifies the particular algorithm that was used to compress the data 136C. The ILDC engine 150 may then check whether the algorithm is available to software component 150a, to hardware component 150b, or to both. If the algorithm is available only to one or the other of components 150a and 150b, the ILDC engine 150 directs the compressed data 136C to the component that has the necessary algorithm. However, if the algorithm is available to both components 150a and 150b, the ILDC engine 150 may select between components 150a and 150b based on input from the decompression policy 152. If the software component 150a is selected, the software component 150a performs the decompression, i.e., by executing software instructions on one or more of the set of processors 124. If the hardware component 150b is selected, the hardware component 150b directs the compression hardware 126 to decompress the data 136C. The SP 120 then returns the resulting uncompressed data 136U to the requesting host 110.

It should be appreciated that the ILDC engine 150 is not required to use software component 150a to decompress data that was compressed by the software component 140a of the ILC engine 140. Nor is it required that the ILDC engine 150 use hardware component 150b to decompress data that was compressed by the hardware component 140b. Rather, the component 150a or 150b may be selected flexibly as long as algorithms are compatible. Such flexibility may be especially useful in cases of data migration. For example, consider a case where data object 170 is migrated to a second data storage system (not shown). If the second data storage system does not include compression hardware 126, then any data compressed using hardware on data storage system 116 may be decompressed on the second data storage system using software.

With the arrangement of FIG. 1, the SP 120 intelligently directs compression and decompression tasks to software or to hardware based on operating conditions in the data storage system 116. For example, if the set of processing units 124 are already busy but the compression hardware 126 is not, the compression policy 142 can direct more compression tasks to hardware component 140b. Conversely, if compression hardware 126 is busy but the set of processing units 124 are not, the compression policy 142 can direct more compression tasks to software component 140a. Decompression policy 152 may likewise direct decompression tasks based on operating conditions, at least to the extent that direction to hardware or software is not already dictated by the algorithm used for compression. In this manner, the data storage system 116 is able to perform inline compression using both hardware and software techniques, leveraging the capabilities of both while applying them in proportions that result in best overall performance.

In such an embodiment in which element 120 of FIG. 1 is implemented using one or more data storage systems, each of the data storage systems may include code thereon for performing the techniques as described herein.

Servers or host systems, such as 110(1)-110(N), provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 116 may be a data storage array, such as a Unity™, a VNX™ or VNXe™ data storage array by EMC Corporation of Hopkinton, Mass., including a plurality of data storage devices 116 and at least two storage processors 120a. Additionally, the two storage processors 120a may be used in connection with failover processing when communicating with a management system for the storage system. Client software on the management system may be used in connection with performing data storage system management by issuing commands to the data storage system 116 and/or receiving responses from the data storage system 116 over a connection. In one embodiment, the management system may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

In some arrangements, the data storage system 116 provides block-based storage by storing the data in blocks of logical storage units (LUNs) or volumes and addressing the blocks using logical block addresses (LBAs). In other arrangements, the data storage system 116 provides file-based storage by storing data as files of a file system and locating file data using inode structures. In yet other arrangements, the data storage system 116 stores LUNs and file systems, stores file systems within LUNs, and so on.

As further shown in FIG. 1, the memory 130 includes a file system and a file system manager 162. A file system is implemented as an arrangement of blocks, which are organized in an address space. Each of the blocks has a location in the address space, identified by FSBN (file system block number). Further, such address space in which blocks of a file system are organized may be organized in a logical address space where the file system manager 162 further maps respective logical offsets for respective blocks to physical addresses of respective blocks at specified FSBNs. In some cases, data to be written to a file system are directed to blocks that have already been allocated and mapped by the file system manager 162, such that the data writes prescribe overwrites of existing blocks. In other cases, data to be written to a file system do not yet have any associated physical storage, such that the file system must allocate new blocks to the file system to store the data. Further, for example, FSBN may range from zero to some large number, with each value of FSBN identifying a respective block location. The file system manager 162 performs various processing on a file system, such as allocating blocks, freeing blocks, maintaining counters, and scavenging for free space.

In at least one embodiment of the current technique, an address space of a file system may be provided in multiple ranges, where each range is a contiguous range of FSBNs and is configured to store blocks containing file data. In addition, a range includes file system metadata, such as inodes, indirect blocks (IBs), and virtual block maps (VBMs), for example. As is known, inodes are metadata structures that store information about files and may include pointers to IBs. IBs include pointers that point either to other IBs or to data blocks. IBs may be arranged in multiple layers, forming IB trees, with leaves of the IB trees including block pointers that point to data blocks. Together, the leaf IB's of a file define the file's logical address space, with each block pointer in each leaf IB specifying a logical address into the file. Virtual block maps (VBMs) are structures placed between block pointers of leaf IBs and respective data blocks to provide data block virtualization. The term "VBM" as used herein describes a metadata structure that has a location in a file system that can be pointed to by other metadata structures in the file system and that includes a block pointer to another location in a file system, where a data block or another VBM is stored. However, it should be appreciated that data and metadata may be organized in other ways, or even randomly, within a file system. The particular arrangement described above herein is intended merely to be illustrative.

Further, in at least one embodiment of the current technique, ranges associated with an address space of a file system may be of any size and of any number. In some examples, the file system manager 162 organizes ranges in a hierarchy. For instance, each range may include a relatively small number of contiguous blocks, such as 16 or 32 blocks, for example, with such ranges provided as leaves of a tree. Looking up the tree, ranges may be further organized in CG (cylinder groups), slices (units of file system provisioning, which may be 256 MB or 1 GB in size, for example), groups of slices, and the entire file system, for example. Although ranges 154 as described above herein apply to the lowest level of the tree, the term "ranges" as used herein may refer to groupings of contiguous blocks at any level.

In at least one embodiment of the technique, hosts 110 (1-N) issue IO requests 112(1-N) to the data storage system 116. The SP 120 receives the IO requests 112(1-N) at the communication interfaces 122 and initiates further processing. Such processing may include, for example, performing read and write operations on a file system, creating new files in the file system, deleting files, and the like. Over time, a file system changes, with new data blocks being allocated and allocated data blocks being freed. In addition, the file system manager 162 also tracks freed storage extents. In an example, storage extents are versions of block-denominated data, which are compressed down to sub-block sizes and packed together in multi-block segments. Further, a file system operation may cause a storage extent in a range to be freed e.g., in response to a punch-hole or write-split operation. Further, a range may have a relatively large number of freed fragments but may still be a poor candidate for free-space scavenging if it has a relatively small number of allocated blocks. With one or more candidate ranges identified, the file system manager 162 may proceed to perform free-space scavenging on such range or ranges. Such scavenging may include, for example, liberating unused blocks from segments (e.g., after compacting out any unused portions), moving segments from one range to another to create free space, and coalescing free space to support contiguous writes and/or to recycle storage resources by returning such resources to a storage pool. Thus, file system manager 162 may scavenge free space, such as by performing garbage collection, space reclamation, and/or free-space coalescing.

Figure 2:
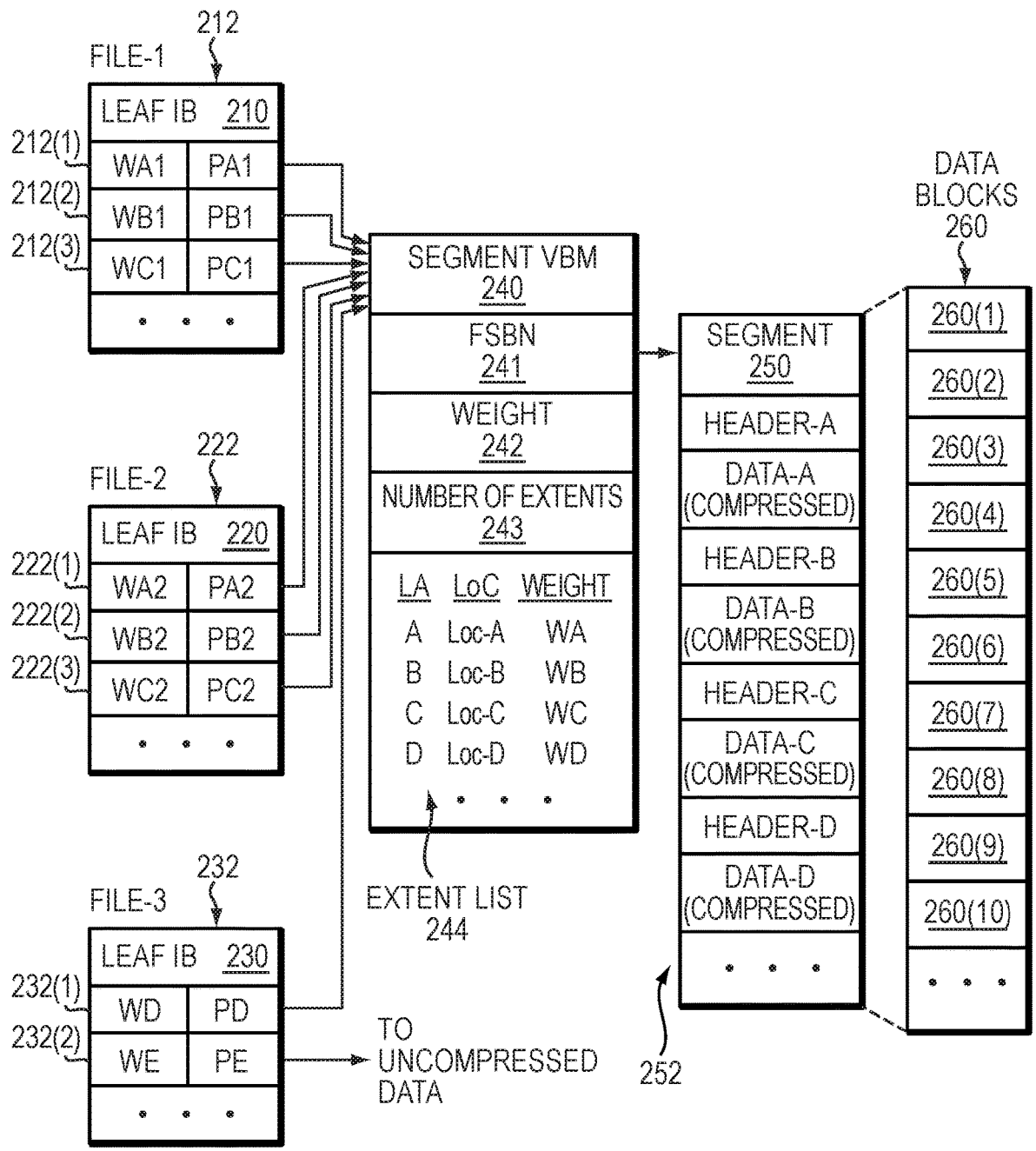
FIGS. 2-3 are diagrams illustrating in more detail components that may be used in connection with techniques herein.

Referring to FIG. 2, shown is more detailed representation of components that may be included in an embodiment using the techniques herein. FIG. 2 illustrates a set of data blocks selected by persistent file data cache aggregation logic of a storage system. As shown in FIG. 2, a segment 250 that stores data of a file system is composed from multiple data blocks 260. Here, segment 250 is made up of at least ten data blocks 260(1) through 260(10); however, the number of data blocks per segment may vary. In an example, the data blocks 260 are contiguous, meaning that they have consecutive FSBNs in a file system address space for the file system. Although segment 250 is composed from individual data blocks 260, the file system treats the segment 250 as one continuous space. Compressed storage extents 252, i.e., Data-A through Data-D, etc., are packed inside the segment 250. In an example, each of storage extents 252 is initially a block-sized set of data, which has been compressed down to a smaller size. An 8-block segment may store the compressed equivalent of 12 or 16 blocks or more of uncompressed data, for example. The amount of compression depends on the compressibility of the data and the particular compression algorithm used. Different compressed storage extents 252 typically have different sizes. Further, for each storage extent 252 in the segment 250, a corresponding weight is maintained, the weight arranged to indicate whether the respective storage extent 252 is currently part of any file in a file system by indicating whether other block pointers in the file system point to that block pointer.

The segment 250 has an address (e.g., FSBN 241) in the file system, and a segment VBM (Virtual Block Map) 240 points to that address. For example, segment VBM 240 stores a segment pointer 241, which stores the FSBN of the segment 250. By convention, the FSBN of segment 250 may be the FSBN of its first data block, i.e., block 260(1). Although not shown, each block 260(1)-260(10) may have its respective per-block metadata (BMD), which acts as representative metadata for the respective, block 260(1)-260(10), and which includes a backward pointer to the segment VBM 240.

As further shown in FIG. 2, the segment VBM 240 stores information regarding the number of extents 243 in the segment 250 and an extent list 244. The extent list 244 acts as an index into the segment 250, by associating each compressed storage extent 252, identified by logical address (e.g., LA values A through D, etc.), with a corresponding location within the segment 250 (e.g., Loc values Loc-A through Loc-D, etc., which indicate physical offsets) and a corresponding weight (e.g., Weight values WA through WD, etc.). The weights provide indications of whether the associated storage extents are currently in use by any files in the file system. For example, a positive number for a weight may indicate that at least one file in the file system 150 references the associated storage extent 252. Conversely, a weight of zero may mean that no file in the file system currently references that storage extent 252. It should be appreciated, however, that various numbering schemes for reference weights may be used, such that positive numbers could easily be replaced with negative numbers and zero could easily be replaced with some different baseline value. The particular numbering scheme described herein is therefore intended to be illustrative rather than limiting.

In an example, the weight (e.g., Weight values WA through WD, etc.) for a storage extent 252 reflects a sum, or "total distributed weight," of the weights of all block pointers in the file system that point to the associated storage extent. In addition, the segment VBM 240 may include an overall weight 242, which reflects a sum of all weights of all block pointers in the file system that point to extents tracked by the segment VBM 240. Thus, in general, the value of overall weight 242 should be equal to the sum of all weights in the extent list 242.

Various block pointers 212, 222, and 232 are shown to the left in FIG. 2. In an example, each block pointer is disposed within a leaf IB (Indirect Block), which performs mapping of logical addresses for a respective file to corresponding physical addresses in the file system. Here, leaf IB 210 is provided for mapping data of a first file (F1) and contains block pointers 212(1) through 212(3). Also, leaf IB 220 is provided for mapping data of a second file (F2) and contains block pointers 222(1) through 222(3). Further, leaf IB 230 is provided for mapping data of a third file (F3) and contains block pointers 232(1) and 232(2). Each of leaf IBs 210, 220, and 230 may include any number of block pointers, such as 1024 block pointers each; however, only a small number are shown for ease of illustration. Although a single leaf IB 210 is shown for file-1, the file-1 may have many leaf IBs, which may be arranged in an IB tree for mapping a large logical address range of the file to corresponding physical addresses in a file system to which the file belongs. A "physical address" is a unique address within a physical address space of the file system.

Each of block pointers 212, 222, and 232 has an associated pointer value and an associated weight. For example, block pointers 212(1) through 212(3) have pointer values PA1 through PC1 and weights WA1 through WC1, respectively, block pointers 222(1) through 222(3) have pointer values PA2 through PC2 and weights WA2 through WC2, respectively, and block pointers 232(1) through 232(2) have pointer values PD through PE and weights WD through WE, respectively.

Regarding files F1 and F2, pointer values PA1 and PA2 point to segment VBM 240 and specify the logical extent for Data-A, e.g., by specifying the FSBN of segment VBM 240 and an offset that indicates an extent position. In a like manner, pointer values PB1 and PB2 point to segment VBM 240 and specify the logical extent for Data-B, and pointer values PC1 and PC2 point to segment VBM 240 and specify the logical extent for Data-C. It can thus be seen that block pointers 212 and 222 share compressed storage extents Data-A, Data-B, and Data-C. For example, files F1 and F2 may be snapshots in the same version set. Regarding file F3, pointer value PD points to Data-D stored in segment 250 and pointer value PE points to Data-E stored outside the segment 250. File F3 does not appear to have a snapshot relationship with either of files F1 or F2. If one assumes that data block sharing for the storage extents 252 is limited to that shown, then, in an example, the following relationships may hold:

$WA=WA1+WA2;$ $WB=WB1+WB2;$ $WC=WC1+WC2;$ $WD=WD;$ and

Weight 242=$\Sigma Wi$ (for $i=a$ through $d$, plus any additional extents 252 tracked by extent list 244).

The detail shown in segment 450 indicates an example layout 252 of data items. In at least one embodiment of the current technique, each compression header is a fixed-size data structure that includes fields for specifying compression parameters, such as compression algorithm, length, CRC (cyclic redundancy check), and flags. In some examples, the header specifies whether the compression was performed in hardware or in software. Further, for instance, Header-A can be found at Loc-A and is immediately followed by compressed Data-A. Likewise, Header-B can be found at Loc-B and is immediately followed by compressed Data-B. Similarly, Header-C can be found at Loc-C and is immediately followed by compressed Data-C.

For performing writes, the ILC engine 140 generates each compression header (Header-A, Header-B, Header-C, etc.) when performing compression on data blocks 260, and directs a file system to store the compression header together with the compressed data. The ILC engine 140 generates different headers for different data, with each header specifying a respective compression algorithm. For performing data reads, a file system looks up the compressed data, e.g., by following a pointer 212, 222, 232 in the leaf IB 210, 220, 230 to the segment VBM 240, which specifies a location within the segment 250. A file system reads a header at the specified location, identifies the compression algorithm that was used to compress the data, and then directs the ILDC 150 to decompress the compressed data using the specified algorithm.

In at least one embodiment of the current technique, for example, statistical analysis is performed in which based on an estimated compression ratio by which data of a file system has been compressed, following information is computed for different number of extents (data fragments) that can be included in an extent list of a segment VBM. Such information may include raw amount of storage space used by each of such different number of extents, compressed segment size for each such different number of extents, and the number of allocation units allocated in a segment for each such different number of extents. Further, based on the information, a determination is made as to how much storage space is wasted at the end of a compressed segment for each such different number of extents included in a segment. Thus, for example, based on a compression ratio of 50% and assuming twelve storage extents are selected for a segment VBM, around 2 KB of storage space at the end of the segment remains unused. Similarly, for example, with a compression ratio of 50%, if seven storage extents are selected for including in a segment VBM, around 0.5 KB of storage space at the end of the segment remains unused and if seven storage extents are selected for including in a segment VBM, around 0.4 KB of storage space at the end of the segment remains unused with a compression ratio of 40%. Thus, the number of allocation units that can be accommodated in a segment is determined based on statistical analysis by applying predictive techniques.

Figure 3:
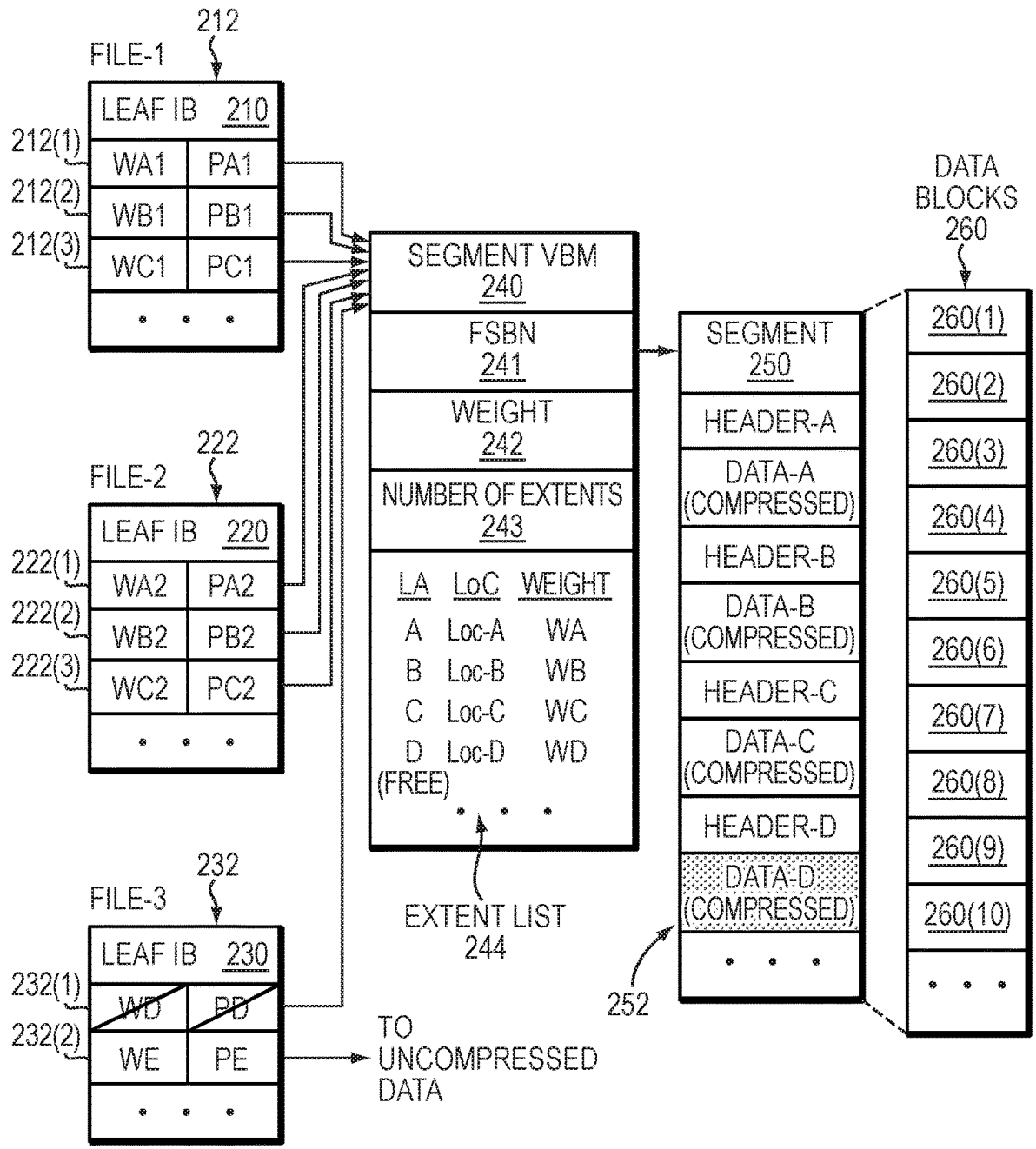

FIG. 3 shows the same arrangement as FIG. 2, except that, here, a file system operation is being performed to file F3 at block pointer 232(1). For example, the file system manager 162 may be performing a punch-hole operation or a write split.

As is known, a punch-hole operation is a host-directed command for zeroing out a particular storage location. For instance, a host 110 may issue a SCSI "WRITE-SAME" operation, which SP 120 translates into a write of zeros to the logical address indicated by block pointer 232(1). This operation releases any weight that block pointer 232(1) holds on the extent for Data-D. Thus, in response to this operation, the file system manager 162 subtracts the weight WD of block pointer 232(1) from the weight WD in the extent list 244. But as block pointer 232(1) is the only block pointer in the file system pointing to Data-D, subtracting WD from the weight in the extent list 244 causes such weight to go to zero. The file system manager 162 detects this transition to zero, and in response to this transition, marks such data fragment in the segment 250 as free. Data-D thus becomes a freed fragment (see shading), and the space that it occupies becomes available to be reclaimed by subsequent scavenging operations.

As also known, a write-split is an operation for which an overwrite is requested on data stored in one or more shared data blocks. Rather than overwriting the shared blocks, which disrupt other files sharing the blocks, the file system allocates new blocks and writes the new data to the newly allocated blocks, breaking the previous sharing relationship. Here, if a file system operation is a write split, then file system manager 162 may respond by allocating a new segment in the file system. For example, if an overwrite request is received for data block pointed by block pointer 212(1), the file system manager 162 may copy the shared data (here, Data-A, which is shared with PA1 and PA2) to the newly allocated segment, where it may be packed with other compressed data. The file system manager 162 may further redirect the pointer value PA1 in block pointer 212(1) to the location of the new segment and assign weight WA1 to a new value. Before discarding the old value of the weight WA1, the file system manager 162 subtracts that value of WA1 from WA, in the same manner described above. It should be appreciated that the metadata structures shown in FIGS. 2 and 3 may be provided as persistent structures of a file system, which may be read into memory but are backed by non-volatile devices in the storage 180.

Having described certain embodiments, numerous alternative embodiments or variations can be made. For example, although particular metadata structures, such as segment VBMs and block pointers, have been shown and described, these are merely examples. Alternatively, other metadata structures may be employed for accomplishing similar results.

Also, although the segment VBM 250 as shown and described includes an extent list 244, this is merely an example. Alternatively, the extent list 244 or a similar list may be provided elsewhere, such as in the segment 250 itself (e.g., as a header).

Further, although the segment VBM 150 provides block virtualization, nothing prevents there from being additional or different block virtualization structures, or additional levels of block virtualization.

Figure 4:
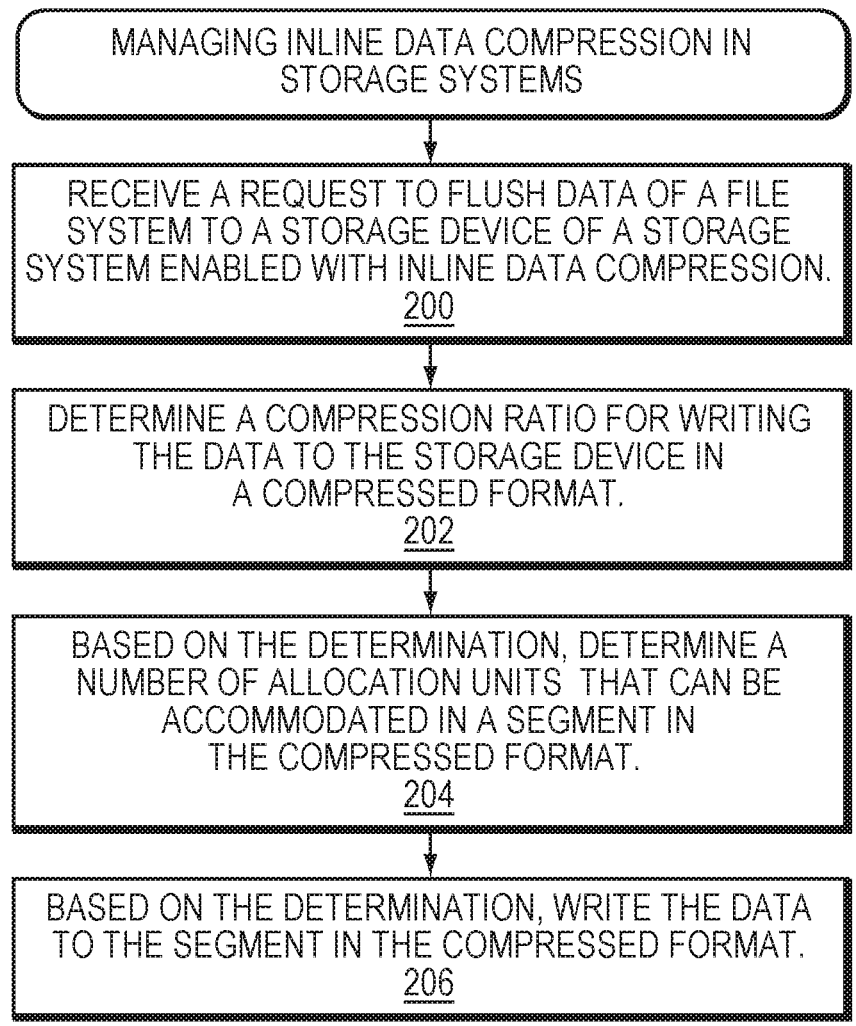
FIG. 4 is a flow diagram illustrating processes that may be used in connection with techniques herein.

Referring to FIG. 4, shown is a more detailed flow diagram illustrating managing mapping metadata in storage systems. With reference also to FIGS. 1-3, in at least one embodiment of the current technique, a request is received to flush data of a file system to a storage device of a storage system enabled with inline data compression functionality (step 200). A determination is made as to a compression ratio at which data is written to the storage device in a compressed format (step 202). Further, based on the determination of the compression ratio, a determination is made as to how many allocation units can be accommodated in a segment in the compressed format (step 204). Based on the determination, the data of the file system is written to the segment in the compressed format (206).

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing inline data compression in storage systems, the method comprising:
receiving a request to flush data of a file system to a storage device of a storage system;
determining a number of allocation units to include in each segment by comparing, for different numbers of allocation units, respective amounts of storage space that would remain unused if the data to be flushed were compressed according to a historical compression ratio achieved by the storage system and stored, in a set of segments, according to the number of allocation units per segment, each segment also storing metadata corresponding to each allocation unit stored therein; and
compressing the data and writing the compressed data and corresponding metadata to the set of segments in the number of allocation units per segment corresponding to the smallest amount of unused storage space.

2. The method of claim 1, wherein the number of allocation units is determined based on statistical analysis by applying predictive techniques.

3. The method of claim 1, further comprising:
evaluating information for determining the number of allocation units in which the segment is apportioned, wherein evaluating the information includes determining for different sets of file system blocks an amount of storage space used by the different sets of file system blocks, the size of a compressed segment including the different sets of file system blocks, and the number of allocation units allocated in the segment.

4. The method of claim 3, further comprising:
based on the evaluation, determining the amount of storage space that remains unused at the end of a compressed segment.

5. The method of claim 1, wherein the file system is organized as a file system hierarchy of file system blocks, wherein the file system blocks include a set of indirect data blocks, each indirect data block including a set of data blocks.

6. The method of claim 1, wherein a persistent file data cache aggregation logic selects a set of allocation units for compressing the set of allocation units in a segment, wherein an allocation unit is a file system block.

7. The method of claim 1, wherein a file system utility scavenges unused storage space from an address space of a file system by freeing unused allocation units from a segment.

8. The method of claim 1, wherein a mapping pointer is associated with a file system block of a file, wherein the mapping pointer includes a distributed weight indicating whether the file system block has been shared.

9. The method of claim 8, wherein a mapping pointer of a file system block refers to a segment virtual block pointer, wherein the segment virtual block pointer includes an extent list including information regarding a set of allocation units compressed in a segment, wherein a file system block number included in the segment virtual block pointer refers to the segment, wherein the segment includes a set of contiguous file system data blocks in a compressed format.

10. A system for use in managing inline data compression in storage systems, the system comprising a processor configured to:
receive a request to flush data of a file system to a storage device of a storage system;
determine a number of allocation units to include in each segment by comparing, for different numbers of allocation units, respective amounts of storage space that would remain unused if the data to be flushed were compressed according to a historical compression ratio achieved by the storage system and stored, in a set of segments, according to the number of allocation units per segment, each segment also storing metadata corresponding to each allocation unit stored therein; and
compress the data and write the compressed data and corresponding metadata to the set of segments in the number of allocation units per segment corresponding to the smallest amount of unused storage space.

11. The system of claim 10, wherein the number of allocation units is determined based on statistical analysis by applying predictive techniques.

12. The system of claim 10, further comprising:
evaluate information for determining the number of allocation units in which the segment is apportioned, wherein evaluating the information includes determining for different sets of file system blocks an amount of storage space used by the different sets of file system blocks, the size of a compressed segment including the different sets of file system blocks, and the number of allocation units allocated in the segment.

13. The system of claim 12, further comprising:
based on the evaluation, determine the amount of storage space that remains unused at the end of a compressed segment.

14. The system of claim 10, wherein the file system is organized as a file system hierarchy of file system blocks, wherein the file system blocks include a set of indirect data blocks, each indirect data block including a set of data blocks.

15. The system of claim 10, wherein a persistent file data cache aggregation logic selects a set of allocation units for compressing the set of allocation units in a segment, wherein an allocation unit is a file system block.

16. The system of claim 10, wherein a file system utility scavenges unused storage space from an address space of a file system by freeing unused allocation units from a segment.

17. The system of claim 10, wherein a mapping pointer is associated with a file system block of a file, wherein the mapping pointer includes a distributed weight indicating whether the file system block has been shared.

18. The system of claim 17, wherein a mapping pointer of a file system block refers to a segment virtual block pointer, wherein the segment virtual block pointer includes an extent list including information regarding a set of allocation units compressed in a segment, wherein a file system block number included in the segment virtual block pointer refers to the segment, wherein the segment includes a set of contiguous file system data blocks in a compressed format.

* * * * *